Patented Jan. 6, 1948

2,433,890

UNITED STATES PATENT OFFICE 2,433,890

PRODUCTION OF ACETALS

Oliver W. Cass, Niagara Falls, N. Y., assignor to E. I. du Pont de Nemours & Company, Wilmington, Del., a corporation of Delaware No Drawing. Application January 16, 1946, Serial No. 641,655

3 Claims. (Cl. 260—615)

This invention relates to the production of acetals, and more particularly, it relates to a new and improved process for the production of haloacetals, i. e., acetals of haloaldehydes.

It is an object of this invention to provide a process for the production of haloacetals which is simple and expedient to carry out on a commercial scale.

It is another object of this invention to provide a process for the production of haloacetals from vinky alkyl ethers.

Other objects of this invention will appear hereinafter.

The objects of this invention may be accomplished in general, by adding a halogen, such as chlorine or bromine, to a solution of a vinyl alkyl ether in an alcohol, preferably a monohydroxy primary lower aliphatic alcohol. The lower members of the series consisting of those alcohols containing five carbon atoms or less are preferred in the practice of this invention.

The reaction may be carried out at room temperature or above room temperature, but preferably it is carried out at a temperature below room temperature, still better below 0° C., since greater yields are thus obtainable. In accordance with the preferred procedure, the vinyl alkyl ether is charged into a suitably cooled reaction vessel which contains a sufficient amount of the lower aliphatic alcohol to act as both a solvent and reactant. The halogen is added to the solution of the ether in the alcohol, preferably with agitation. The total amount of halogen, chlorine or bromine, added to the solution, is not critical to the reaction; preferably, however, it should be in approximate equimolecular amount with the ether contained in the solution.

The reaction vessel is preferably glass-lined or constructed of other acid-resistant material. Particularly good results can be obtained if the reaction vessel is equipped with suitable means for agitation and cooling of the reactor contents, as well as a temperature recording device, an inlet tube for chlorine, and an exit tube for off-gases from the reaction, comprising a reflux condenser. This exit tube should preferably be connected with a suitable absorption system for handling the hydrogen chloride and unreacted chlorine contained in the off-gases.

The vinyl alkyl ethers containing less than 5 carbon atoms in the alkyl group, outstandingly vinyl methyl ether and vinyl ethyl ether, are greatly preferred for the production of the haloacetals in accordance with the process of this invention, but vinyl ethers of higher aliphatic alcohols may also be used. Preferably, the alcohol used as solvent and reactant should contain the same number of carbon atoms as the alkyl group of the vinyl alkyl ether. This is not essential, however, since the reaction can be carried out with an alcohol of a different number of carbon atoms to obtain an acetal having alkyloxy radicals of different carbon chain lengths.

The process of the present invention may, if desired, be carried out in the presence of suitable inert diluents, for example, chloroform, carbontetrachloride, benzene, or the like, which may be separated by distillation from the acetal product. The use of an inert diluent is, however, purely optional and is not essential.

Following the halogenation, it is generally found desirable to allow the reaction mixture to stand for several hours in order to permit a more complete reaction to occur and to insure the production of the acetals in high yields. During this period, cooling of the mixture is found to be unnecessary and, in general, the mixture is allowed to stand at room temperature.

The acetals may be recovered from the reaction mixtures by convenient methods. In accordance with the present invention, we have secured an effective separation by adding water to the mixture and extracting the acetal layer with a water immiscible solvent such as ether, benzene, chloroform, etc.

Following recovery of ether extract, the extract may be washed with water and an aqueous alkaline solution such as a solution of sodium bicarbonate to remove acidic or other water soluble constituents and the solvent removed by distillation. Subsequently, the acetal may be purified by distillation or by other suitable methods.

The following example is given to illustrate, in detail, a preferred process of practicing the invention, it being understood, of course, that the invention is not limited to the details of this example.

*Example*

Into a flask was charged 825 cc. of methanol in which 174 grams of methyl vinyl ether was dissolved. The contents of the flask were cooled to −60° C. by means of a cooling bath. The flask was protected from light and 485 grams of bromine was then slowly added from a dropping funnel while the temperature was maintained below −50° C.

The mixture was then allowed to warm to room temperature and allowed to stand overnight. The contents of the reaction flask was then poured into an equal volume of ice water and the oily liquid separated. The aqueous layer was repeatedly extracted with ether, and the ether extract combined with the oily layer. The oily layer was then washed with cold sodium bicarbonate solution until it no longer showed an acid reaction to litmus. It was then dried with anhydrous calcium chloride. The ether was stripped from the solution and the product then recovered by vacuum fractionation. There was secured 252 grams of methyl beta bromo acetal boiling at 56° C. to 62° C. at 30 mm. and having the density at 20° C. of 1.570. This is approximately a yield of 50% of the theoretical.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The process for the production of a haloacetal which comprises passing a halogen taken from the group consisting of chlorine nad bromine into a solution of vinyl alkyl ether, containing less than 5 carbon atoms in the alkyl group, in a monohydroxy, primary aliphatic alcohol containing not to exceed 5 carbon atoms.

2. The process for the production of a haloacetal which comprises passing a halogen taken from the group consisting of chlorine and bromine into a solution of vinyl methyl ether in methyl alcohol.

3. The process for the production of a haloacetal which comprises passing a halogen taken from the group consisting of chlorine and bromine into a solution of vinyl ethyl ether in ethyl alcohol.

OLIVER W. CASS.

REFERENCES CITED

The following references are of record in the file of this patent:

UNITED STATES PATENTS

| Number | Name | Date |
|---|---|---|
| 2,000,252 | Reppe et al. | May 7, 1935 |
| 2,247,482 | Dickey et al. | July 1, 1941 |
| 2,330,570 | Filachione | Sept. 28, 1943 |
| 2,411,826 | Filachione | Nov. 26, 1946 |

OTHER REFERENCES

Wislicenus, "Justis Liebig's Annalen der Chemic," vol. 192, pages 106 to 113 (1878).